(12) United States Patent
Kenyon

(10) Patent No.: US 6,766,174 B1
(45) Date of Patent: Jul. 20, 2004

(54) METHOD AND APPARATUS FOR PROVIDING DIRECTIONAL INFORMATION

(75) Inventor: Jeffrey D. Kenyon, Boulder, CO (US)

(73) Assignee: Qwest Communications, Int'l., Inc., Denver, CO (US)

(*) Notice: Subject to any disclaimer, the term of this patent is extended or adjusted under 35 U.S.C. 154(b) by 0 days.

(21) Appl. No.: 09/276,292

(22) Filed: Mar. 25, 1999

(51) Int. Cl.[7] ............................................... H04Q 7/20
(52) U.S. Cl. .................... 455/457; 455/456; 455/457; 701/201; 701/211; 342/357
(58) Field of Search ................... 455/456, 457, 455/33.1, 461, 466, 422, 414, 406; 379/58, 59, 63; 342/357.09, 357, 350, 357.1; 701/201, 213, 211

(56) References Cited

U.S. PATENT DOCUMENTS

| | | | | |
|---|---|---|---|---|
| 5,625,668 A | * | 4/1997 | Loomis et al. | 379/58 |
| 5,712,899 A | * | 1/1998 | Pace, II | 379/58 |
| 5,959,577 A | * | 9/1999 | Fan et al. | 342/357.13 |
| 6,049,718 A | * | 4/2000 | Stewart | 455/456 |
| 6,122,521 A | * | 9/2000 | Wilkinson et al. | 455/457 |
| 6,272,332 B1 | * | 8/2001 | Matsumoto et al. | 455/412 |
| 6,292,743 B1 | * | 9/2001 | Pu et al. | 455/456.6 |
| 6,314,295 B1 | * | 11/2001 | Kawamoto | 455/457 |
| 6,522,875 B1 | * | 2/2003 | Dowling et al. | 455/414.3 |

OTHER PUBLICATIONS

"An Introduction to SnapTrack™ Server–Aided GPS Technology" http://www.snaptrack.com; 11/98.

* cited by examiner

*Primary Examiner*—Edward F. Urban
*Assistant Examiner*—Lana Le
(74) *Attorney, Agent, or Firm*—Kenneth J. Johnson; Robert G. Crouch; Marsh Fischmann & Breyfogle LLP

(57) ABSTRACT

A communications system provides the functionality to provide a wireless telephone user directional information to a desired destination. Incorporated into the wireless telephone is a position determining device such as a global positioning system (GPS) device. When a phone user establishes a connection with a particular switch in the wireless network, this positional information from the GPS device is provided and the location of the wireless phone may be determined. The wireless telephone user also provides information regarding the desired destination. Associated with the destination code for the desired destination is a physical street address. Using the known location of the wireless telephone and the street address for the desired destination, a mapping procedure may be performed to determine a route between the two points. This route may be then converted to audio and/or alphanumeric directions. The directions would then be transmitted to the wireless phone which would either present them in audio form, or via a display incorporated into the telephone.

6 Claims, 5 Drawing Sheets

| DESTINATION CODE | STREET ADDRESS |
|---|---|
| (303) 555-1616 | 1212 Main Street |
| (303) 555-1617 | 103 Maple |
| (303) 555-1618 | 196 Oak |
| (303) 555-1619 | 143 Pine |
| (303) 555-1620 | 187 Willow |
| (303) 555-1621 | 962 Branch |
| (303) 555-1622 | 541 Birch |
| (303) 555-1623 | 631 Cyprus |

FIG. 4

METHOD AND APPARATUS FOR PROVIDING DIRECTIONAL INFORMATION

FIELD OF THE INVENTION

The invention relates to a method and apparatus for providing directional information, and more particularly to providing directional information to a handheld communications device such as a wireless phone.

BACKGROUND OF THE INVENTION

Cellular or wireless phones have become a very common mode of communication. In order to employ these wireless devices, networks of towers are positioned at various locations, and through these towers telephonic connections are established with the public switch telephone network (PSTN). Through the PSTN, the telephone calls can be routed over landlines to their desired destination or back to the cellular network to be transmitted to another wireless telephone.

In the early days of wireless communications, the types of information which may have been transmitted to and from these wireless devices was limited. This information may have included the identification data for the particular device, as well as the telephone number to which a connection is to be established. This information is in addition to the analog audio information which was transmitted between the wireless devices and the telephone network.

In recent times, the amount of information which may be processed by a wireless communications device has significantly increased. Many wireless telephones now include the capability to display alphanumeric messages, as well as transmit alphanumeric messages which are entered by the telephone user through the keypad. All of this is in addition to the transmission and receipt of audio information.

One technology which is finding more applications is global positioning systems (GPS). Through this technology, a geographic location for a person or device may be determined within a small margin of error. These devices work by triangulating signals received from at least three satellites orbiting the earth, and then through performance of various calculations, a geographic position may be determined. The devices created to perform these calculations have been miniaturized to the point that the components may be incorporated into a chip set which easily fits within a handheld communications device such as a wireless phone.

SUMMARY OF THE INVENTION

The inventor has recognized that the operation of a wireless telephone may be further enhanced by incorporating position locating technology therein. If the location of a wireless telephone may be determined through electronic means, certain processing operations may be performed at remote locations, such as a telephone network switch, in order to provide audio and/or alphanumeric directions to the user of the wireless telephone from their current location to a desired destination.

Disclosed herein is a method and apparatus for providing directional information to a wireless communications device based on positional information received. Included in the system is a wireless communications device which includes the functionality to receive, transmit and, in the case of alphanumeric data, display information. Incorporated into the wireless telephone is a device which provides position information relating to the geographic location of the wireless telephone. In one aspect of the invention, this position determining device may be a global positioning system (GPS) chip set which processes information which is received from navigational satellites and provides positional information via a transmission from the wireless device.

A wireless communications network may be employed which transports communication signals to and from the wireless communications device. In connection with the wireless network, may be a switch which includes an apparatus for processing the positional information to determine a geographical location for the wireless telephone. Also included at the switch may be various devices for searching databases and calculating and providing directional information based on the geographic location of the wireless communications device and a desired destination which is provided by the wireless communications device user.

In one aspect of the invention, a wireless communications device user may enter a special code for a desired destination. Included at the switch may be a database which associates destination codes with physical addresses for the destination. Once a wireless communications device user enters a specific code, the database may be searched in order to identify the street address for the desired destination. Modules are further included in the switch for calculating a path to be followed from the current geographic location of the wireless telephone to the desired destination.

The directional information may be provided to the wireless telephone in a number of ways. Audio instructions may be generated at the switch and transmitted over the wireless network to the device to which the device user may listen. Further, the directional information may be converted into alphanumeric information which is transmitted over the wireless network to the wireless device and disclosed to the telephone user through the display incorporated into the wireless device. Still further, a combination of both alphanumeric and audio instructions may be transmitted to the wireless telephone.

In another aspect of the invention, the destination code which is entered by the wireless telephone user may be the telephone number for the desired destination. A table may be created and periodically updated which associates telephone numbers with street addresses. Further, if a special service is provided, unique destination codes, may be only two or three digits long, may be entered in order to identify a destination to which directional information will be generated.

DESCRIPTION OF THE DRAWINGS

FIG. 4 discloses an example of a table which associates destination code information with geographic location information.

DESCRIPTION OF PREFERRED EMBODIMENTS

Figure 1:
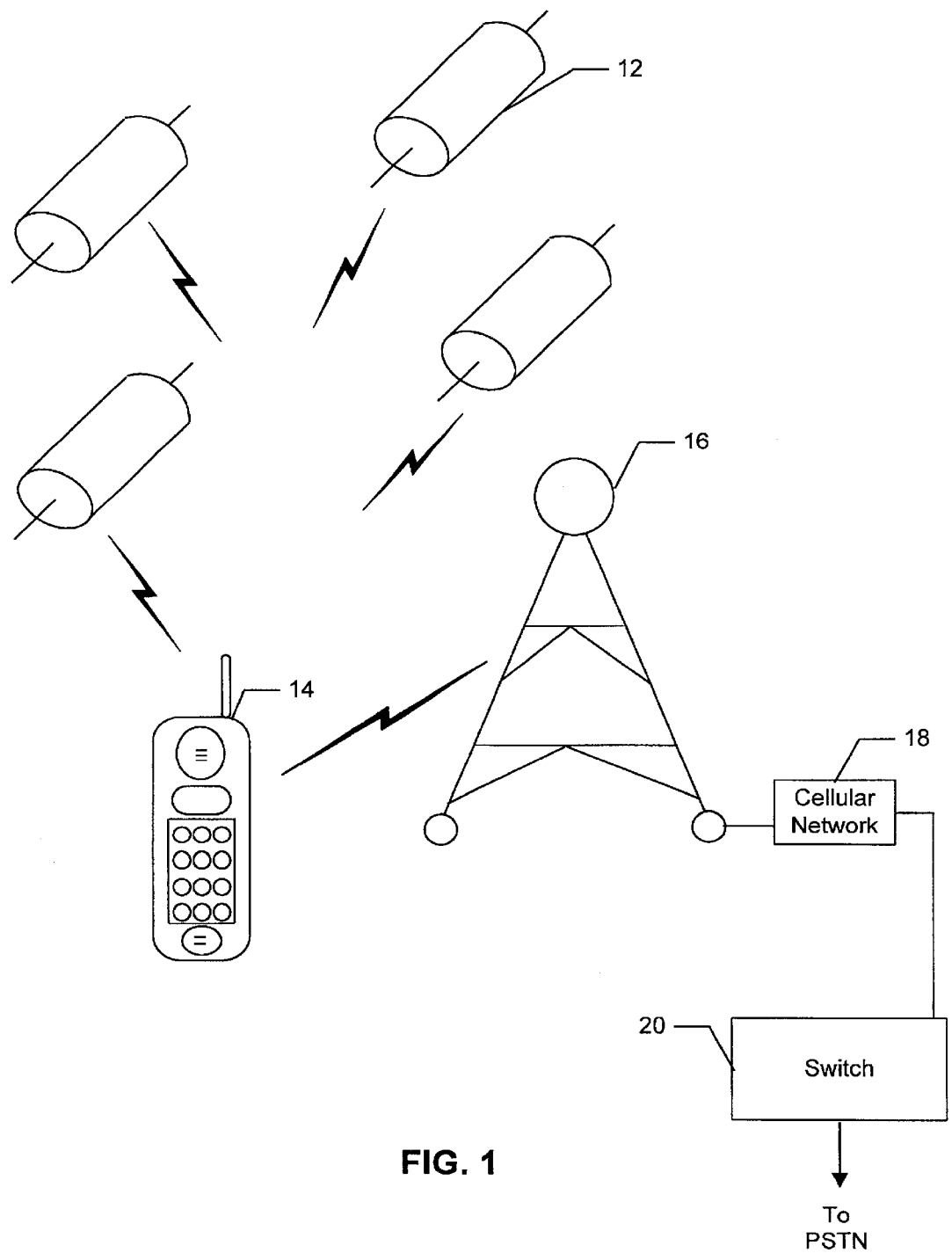
FIG. 1 discloses a system diagram which provides an overview for the communications system.

Disclosed in FIG. 1 is an overall system diagram which includes various components of the system described herein. The wireless communication device employed as part of the system may be a wireless telephone 14. Incorporated into the telephone may be a display 13, as well as a keypad 15 for entering alphanumeric information. Incorporated into the wireless telephone may be a positioning system such as a global positioning system (GPS) chipset which processes signals received from the GPS satellites 12 orbiting the earth. As is well known in GPS technology, the signals may be triangulated to determine a geographic location for the device.

During normal operations, the user of the wireless telephone may establish contact with the wireless network through a geographically positioned wireless tower 16. The tower in connection with the wireless network 18 which routes signals to the appropriate location. Routing of the signals is performed by numerous switches, one of which, switch 20, is shown in FIG. 1. Within the switch a number of functions are performed with regards to the invention described herein. These functions are described in detail below.

Figure 2:
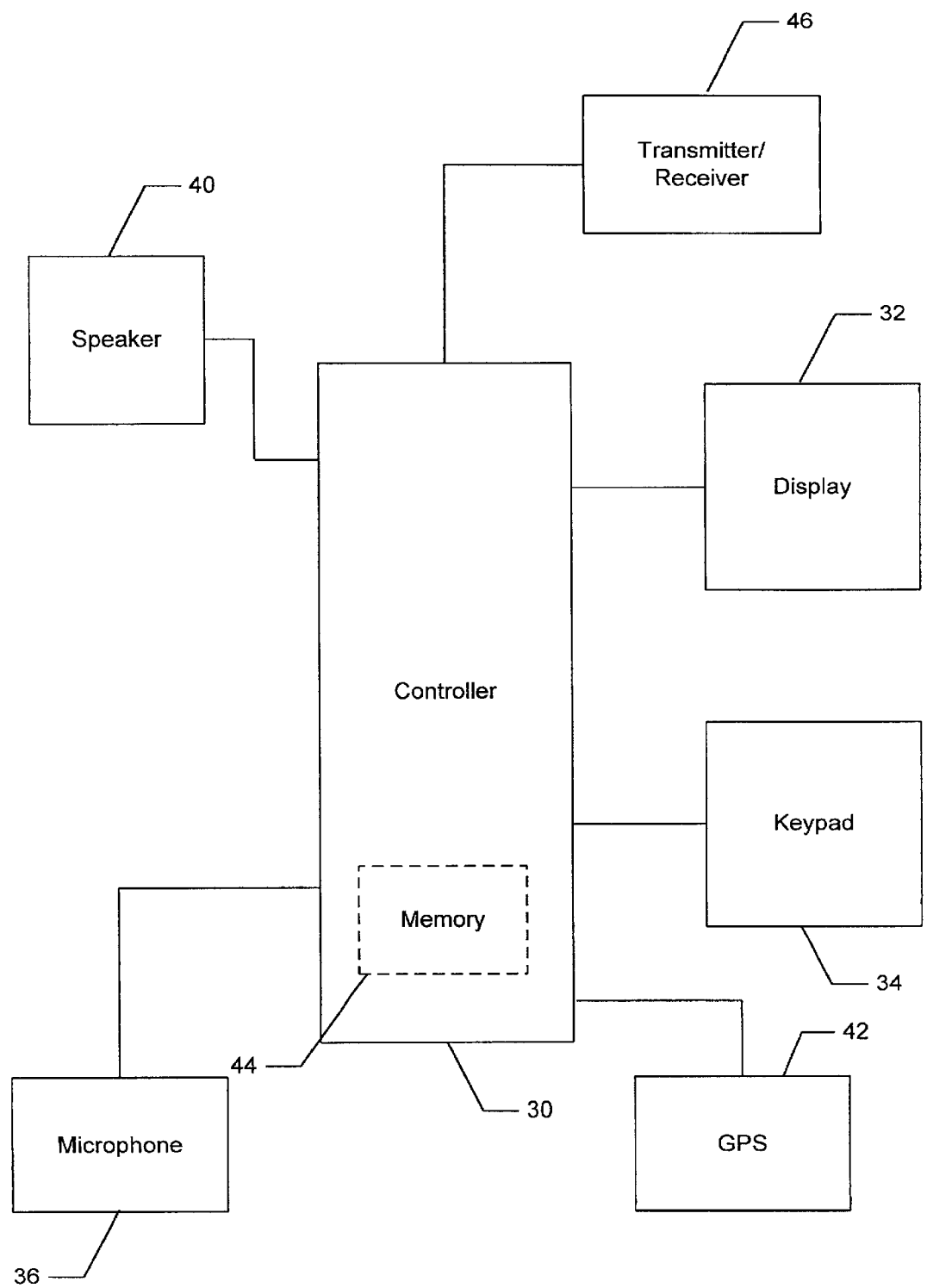
FIG. 2 discloses an internal system diagram for a wireless telephone.

The invention described herein performs the service of providing directions to a wireless telephone user from the current location of the wireless telephone to a desired destination. Disclosed in FIG. 2 is a system diagram for a wireless telephone which incorporates the functionality to provide position information in both audio and alphanumeric form. At the center of the operating system is the controller 30. This controller coordinates all the necessary functions for the telephone. Connected to the controller are the microphone 36 for receiving audio information and the speaker 40 for listening to audio information transmitted to the telephone. The transmitter/receiver 46 provides for the receipt and transmission of audio, alphanumeric or other types of information transmitted to and from the wireless telephone. The signals processed by the transmitter/receiver 46 may include signals received from the navigation satellites.

Display 32 provides for the display of alphanumeric information to the user of the wireless telephone. This screen may be large enough to carry a number of lines of information and possibly display images. Alphanumeric information entered by the telephone user is done through keypad 34. This keypad includes all the numbers necessary for dialing telephone numbers as well as the additional keys which may enhance the operation of the entry of information therein. Also included in the wireless telephone is a GPS apparatus 42. This apparatus may be a chipset of the type commercially available from a company such as SnapTrack, Inc, of San Jose, Calif. These chips perform the triangulation process to determine the geographic location of the wireless telephone. This information is converted into signals which may be transmitted via the transmitter/receiver 46 to the wireless telephone network.

Figure 3:
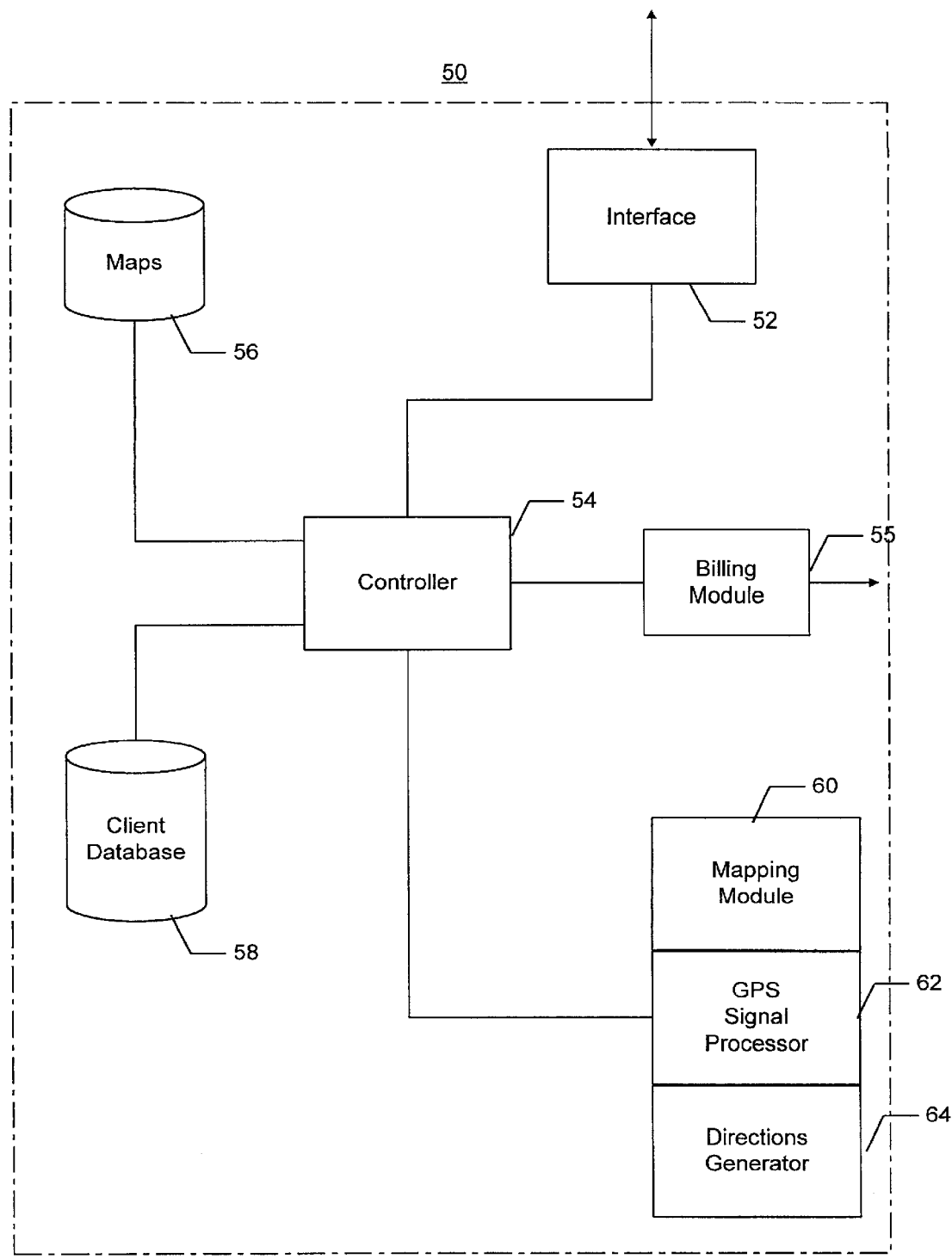
FIG. 3 discloses a system diagram for the network switch.

As was mentioned above, signals transmitted to and from the wireless telephone are carried through the wireless network 18. Incorporated into the wireless network are a series of switches which provide for the routing of the various telephone calls. Disclosed in FIG. 3 is a system diagram which discloses a switch 50 which performs the types of services described herein. The interface 52 provides for the receipt and transmission of communications signals over the wireless network. The controller 54 directs the operations of the switch 50. Connected to the controller 54 are a number of processing modules which provide a variety of different functions. The GPS signal processing module 62 calculates an actual geographic position for a wireless telephone which has provided its geographic information to the switch 50. The generation of this positional information within the wireless telephone, and then transmitting the same over the wireless network is also within the scope of this invention. The mapping module 60 provides the functionality to map a path between two identified geographic points. There are many types of commercial software which provide the capability to employ local street maps in order to identify the best route between two points.

The directional information module 64 provides the capability to convert the mapped routes generated by the mapping module 60 into a series of either audio or alphanumeric instructions. These instructions may then be provided to controller 54 which in turn transmits them to the wireless telephone which has established a connection with the switch.

Also included in the switch 50 are at least two databases. A first database 56 contains the street or road maps necessary in order to provide directions between two geographic points. This information may be street maps for a particular city or particular region which the wireless network is serving. The client database 58 may include information relating to desired destination locations for wireless telephone users. In most situations, the service described herein is provided for business customers who wished to make it easier for their customers to find them. However, one skilled in the art would understand that information relating to any desired destination location can be stored in database.

Disclosed in FIG. 4 is an example of a table which may be included in the client database 58. In the left hand column is a destination code which, in the example shown in FIG. 4, is a telephone number for the desired destination location. It is conceivable that any type of code which the telephone user can enter through the key pad may be used in order to identify a particular destination location. In the right hand column is the actual geographic location, i.e. street address, for the destination locations. Although the example shown in FIG. 4, discloses street addresses, one skilled in the art would know that any type of coordinate and reference system may be employed with regards to identifying the geographical location. A number of services exists today for creating these types of tables. The information employed within the tables is created prior to implementation of the system described herein. However, based on changes which may occur, it may be updated at any time by a system administrator.

Returning to FIG. 3, another component included in the switch is the billing module 55. This module which is in connection with controller 55, provides for the tracking and billing for use of the services described herein. When a particular wireless telephone user receives directions for a desired destination, they may be identified by the telephone number from which the call was placed. This may be done using automatic number identification (ANI). Once the phone number is known, the appropriate accounts may be charged. In an alternate billing scheme, the controller may monitor which of the destination codes, or rather phone numbers, in the table in FIG. 4 are accessed. Based on number of time the street address for a particular business is retrieved, the business associated with the destination code may be billed.

In operation, in order to employ the services described herein, a wireless telephone user will dial a predetermined telephone number for the service. The wireless network will route the telephone call to the switch which provides this service. At this point, the telephone user will enter the destination code for the location to which directions are desired. As was described above, this destination code may be the telephone number for the desired location, however, this code may be any number of digits uniquely assigned to a particular destination location. At or around the same time that the destination code is transmitted to the wireless network, the GPS device within the wireless phone will receive the navigation signals from the satellite and perform the triangularization process to identify a geographic location for the wireless telephone.

As part of the process, the switch receives the destination location to which the wireless telephone user wishes to receive directions for, the geographic information relating to the location of the wireless telephone, and the ANI of the telephone user. Using the location information provided by the wireless telephone, the GPS processor translates this information and determines an actual geographic location for the telephone. The mapping module 60, translates this information to a map provided by the map database 56.

The destination code is employed by the controller to search the client database 58. A scan is performed of the left column to identify a matching telephone number or destination location code. Once this code is found, the corresponding street address or other geographic information is extracted from the database. This address is used by the mapping module to locate a particular geographic point on the map provided by map database 56. With the starting and ending points identified, the mapping module 60 may then determine an optimal path between the location of the wireless telephone and the destination location. Once this route has been determined, the directions generator 64 may convert this route to either audio or alphanumeric instructions, or both. Once these instructions are generated, they are transmitted back to the wireless telephone so that they may either be displayed on the screen incorporated into the telephone, or broadcast as audio instructions. In a final step, the billing module may be employed to establish a connection with the accounting system for the telephone company through use of the caller's ANI.

Figure 5:
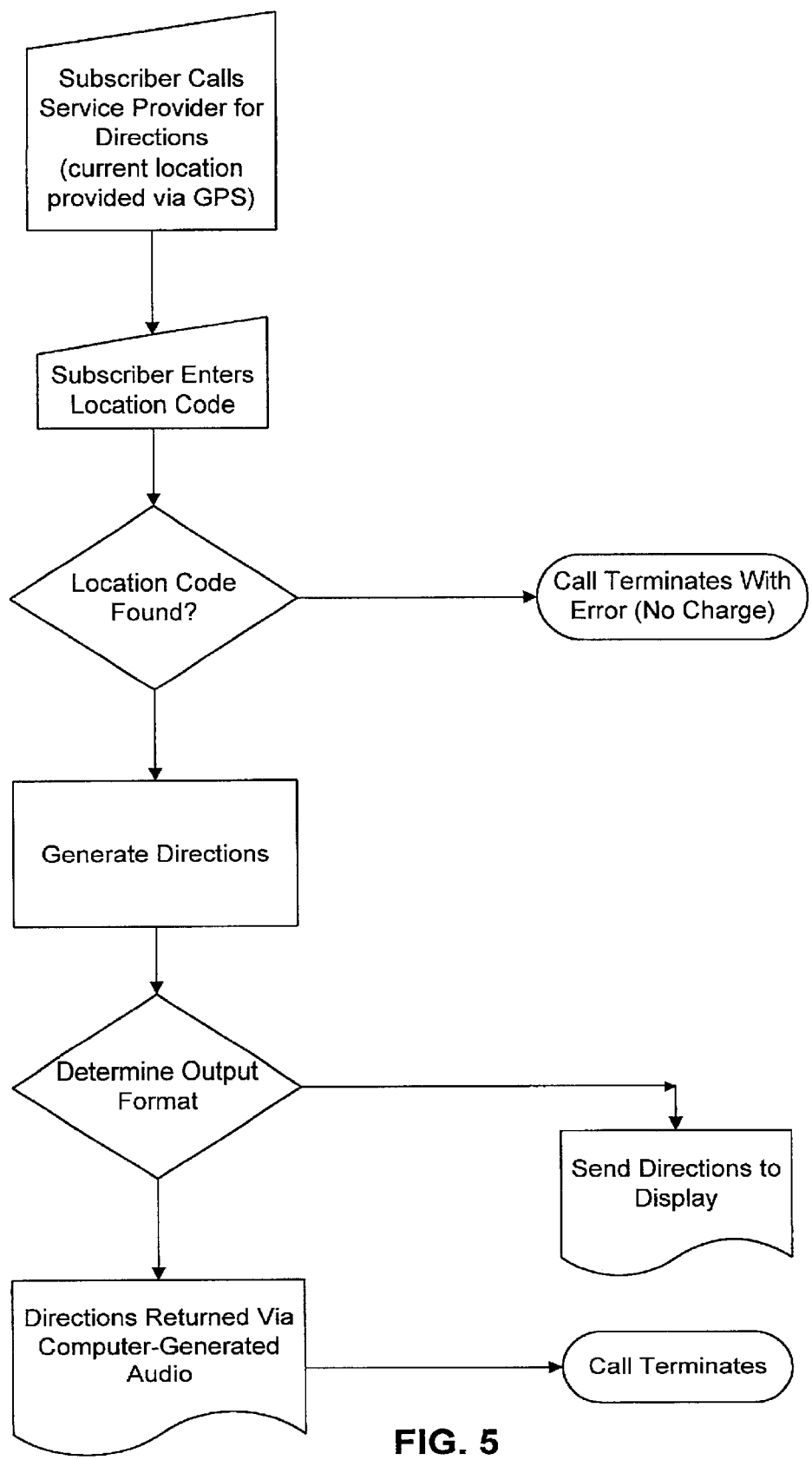
FIG. 5 discloses a flow chart which describes the operation of the system described herein.

Disclosed in FIG. 5 is a flowchart which describes in detail the operation of the switch for providing the directional information. In the first step, the switch detects that a caller has established a connection with the telephone network. At this point, the caller enters a destination code for the desired location. Included with the destination code, is the location information for the wireless telephone provided by the GPS system. At this point, a search is performed of the database containing the destination codes associated with particular geographic location. If the code is not found in the database, the call is terminated and there is no charge to the caller. If the code is found, the mapping module generates directions in the manner described above.

Once the directions have been generated, a decision is then made as to which format the direction should be transmitted in. As was described above, certain wireless phones do not have the capability to display alphanumeric information. This may be detected at the switch and if that is the case, only audio instructions are provided. If the wireless phone does have the capability to receive alphanumeric instructions, this information is transmitted. The third option is for the telephone user to receive both alphanumeric and audio instructions. Once the instructions are sent, the appropriate account is billed and the call is then terminated.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for providing geographic information over a cellular telephone network comprising:

an interface connectable to the cellular telephone network which provides for processing of at least one telephone call from at least one cellular telephone wherein the telephone call includes geographic location information and an entered destination code;

a destination database which includes a plurality of destination codes, where each destination code is associated with a location;

a processing engine in connection with the interface which receives the geographic location information and the destination information and automatically accesses a memory to identify the location associated with the entered destination code;

a mapping module which uses the geographic location information provided in the telephone call and the associated location to calculate an optimal path between the geographic location and the associated location;

a directions generator module which generates directions for the optimal path as a series of instructions in a desired format, where said desired format is presentable on the at least one telephone upon receipt of said directions; and said interface is further configured to transmit the directions over the cellular telephone network to the cellular telephone.

2. The system of claim 1 wherein the desired format comprises at least one of: alphanumeric form which is displayable on the cellular telephone and audio instructions.

3. The system of claim 1 further including a billing processor for billing an account associated with the cellular telephone.

4. The system of claim 1 wherein the geographic location information received over the cellular network is generated by a GPS transceiver in the cellular telephone.

5. The system of claim 1 wherein the destination code comprises at least one of: is a telephone number for the destination location and a preprogrammed code.

6. The system of claim 1 wherein at least one of: the interface, the destination database, the processing engine, and the mapping engine are locatable on a switch in the wireless telephone network.

* * * * *